United States Patent [19]

Passmore

[11] Patent Number: 5,389,791
[45] Date of Patent: Feb. 14, 1995

[54] DEVICE FOR ENHANCING FIELD OF VIEW AND REDUCING IMAGE SMEAR IN A MISSILE SEEKER

[75] Inventor: Ronald C. Passmore, Huntsville, Ala.

[73] Assignee: The United States of America as represented by the Secretary of the Army, Washington, D.C.

[21] Appl. No.: 189,390

[22] Filed: Jan. 31, 1994

[51] Int. Cl.⁶ .......................... H04N 3/06; G01J 5/08
[52] U.S. Cl. .................................. 250/347; 250/342; 250/334; 244/3.16
[58] Field of Search ............... 359/211; 348/202, 164; 250/332, 334, 347, 342; 244/3.16

[56] References Cited

U.S. PATENT DOCUMENTS 4,311,384  1/1982  Keene ................................. 359/211
4,876,448 10/1989  Laucht et al. ....................... 250/234
5,155,597 10/1992  Lareau et al. ..................... 250/578.1

Primary Examiner—Carolyn E. Fields
Attorney, Agent, or Firm—Anthony T. Lane; Hugh P. Nicholson; Hay Kyung Chang

[57] ABSTRACT

A conventional rate-stabilized IR seeker is fitted with an improvement that results in a wider FOV as well as much-reduced image smear. The improvement comprises a circular optical wedge rotatably mounted in front of the optics assembly of the seeker sensor. The combination of the primary scan vector generated by the circulating sensor of the seeker and the secondary scan vector generated by the rotating wedge produces a scan pattern that has a wider total FOV than that of the sensor alone while at the same time providing occasional points of zero or near-zero spatial scan velocity. Such points allow collection of "snapshot" data with little or no image smear.

4 Claims, 7 Drawing Sheets

10 FRAMES OF DATA ABOUT A GIMBALLED CIRCULAR SCAN

DEVICE FOR ENHANCING FIELD OF VIEW AND REDUCING IMAGE SMEAR IN A MISSILE SEEKER

DEDICATORY CLAUSE

The invention described herein may be manufactured, used, and licensed by or for the Government for governmental purposes without the payment to me of any royalties thereon.

BACKGROUND OF THE INVENTION

The current technology for large area search usually embodies linear infrared (IR) arrays which are scanned in one dimension over a large area. When targets are acquired (i.e. located), the on-gimbal scanning motion must be continued to provide a tracking field-of-view (FOV). On the other hand, staring IR focal plane array (FPA), as opposed to the linear IR arrays, are well suited to track targets after acquisition because they develop, through the staring array, a small FOV to accomplish the target track. The advantage of the two-dimensional FPA is that the array stares at the target without scanning and is thusly able to generate a high-quality, rectilinear data sample of the target and the background scene. This characteristic makes the FPA seeker very simple. Further, the fixed nature of the optics and the dewar assembly of the FPA seeker allow for lower cost and better producibility. However, there is a significant limitation with the staring FPA seeker: that is, unless very large and expensive FPA arrays are used, usually the search or acquisition FOV is exceedingly small (comparable to looking through a soda straw). One way to increase the FOV is to scan the staring array over a larger area. But this introduces a new problem, that of image smear due to the scanning velocity. Conventionally, this problem is resolved by a "jerk" scan type approach. That is, the staring FOV collects an image, the gimbals precess to the next image point, the gimbals are stopped, and another image is collected. This process is repeated until the entire desired area has been covered. But such a process is inefficient and requires high gimbal power consumption, high quality gimbal control and positioning instrumentation in order to locate and stabilize in time the IR sensor of the seeker at the positions required to collect the many instantaneous images that result in the view of the entire area. Therefore, what is needed is a means for scanning the staring FOV in a larger search volume in a manner that also reduces, from time to time, the scanning velocity to allow collection of images with little or no smear.

SUMMARY OF THE INVENTION

In a conventional rate-stabilized infrared FPA seeker having a circulatable sensor, two simple scan motions, both easily generated and consuming power uniformly, are combined to cause the sensor to search a circular area with occasional low velocity points in its search path to allow for the collection of "snapshot" data. To effectuate the invention, the pre-programmed circular motion of the sensor by means of the gimbals of the seeker is considered to be the primary scan motion creating the primary scan vector. Instant invention is a means for generating a secondary scan motion, creating the secondary scan vector which, in turn, is combined with the primary scan vector. The secondary scan motion is generated by the rotation of an optical wedge that is mounted in front of the sensor optics assembly. Together the two scan vectors produce the required scan pattern that has occasional points of low or close-to-zero scan velocity.

DESCRIPTION OF THE PREFERRED EMBODIMENT

Figure 1:
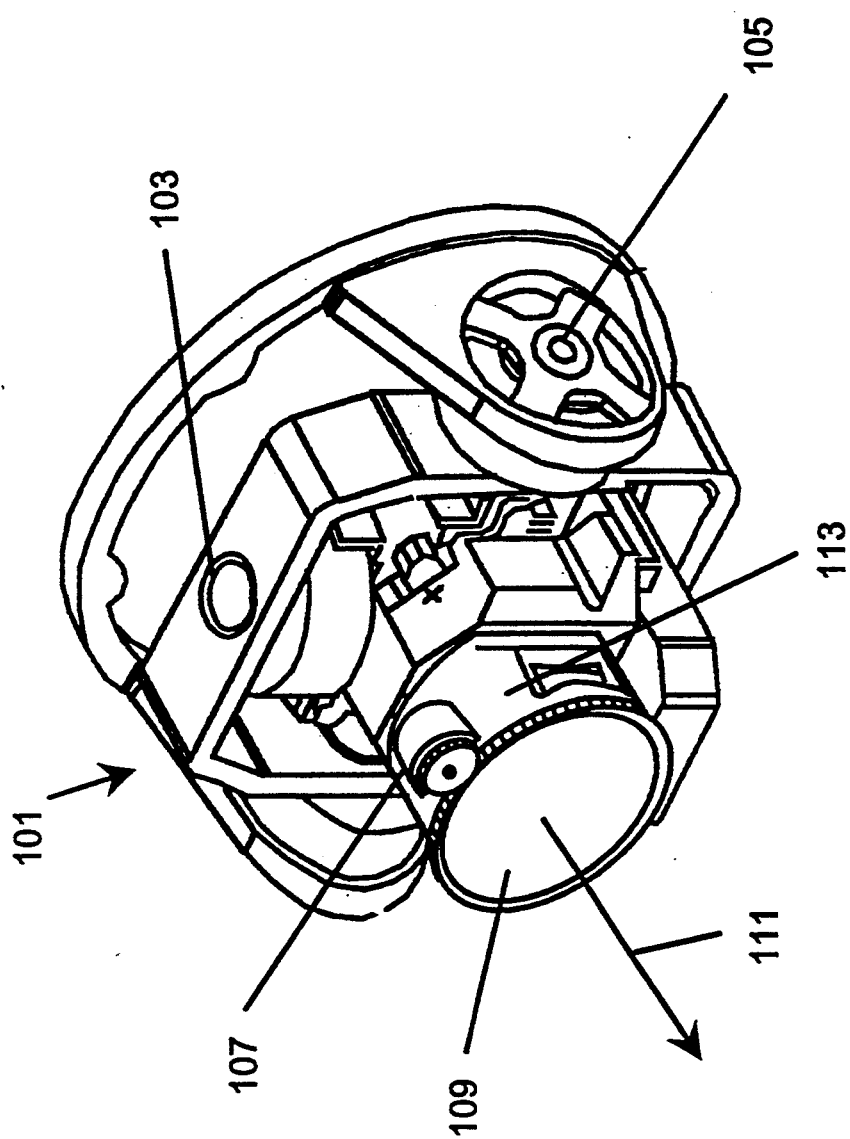
FIG. 1 shows an overall view of the IR seeker incorporating instant invention.
Figure 2:
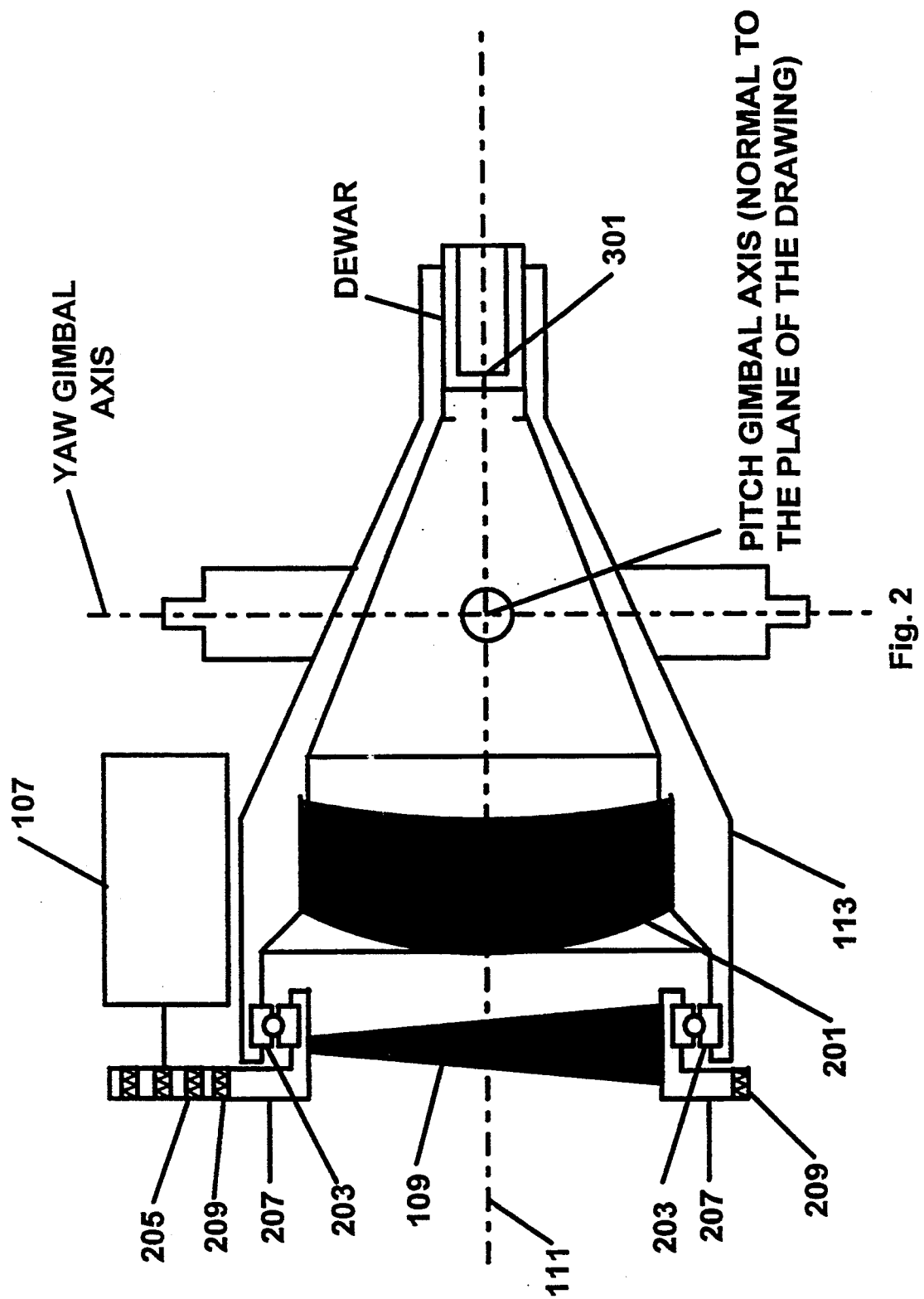
FIG. 2 depicts in greater detail the device of invention.

Referring now to the figures wherein like numbers refer to like parts, FIG. 1 shows an overall view of seeker 101 having yaw gimbal 103 and pitch gimbal 105 for circulating sensor 113 to produce the primary scan vector. The gimbals are driven by electronics, not shown, that are suitably programmed to drive the gimbals in a circular fashion. Into this seeker is incorporated the device of instant invention, i.e., circular optical wedge 109 mounted in front of sensor 113 and aligned with the sensor line of sight (LOS) 111, and motor 107 coupled to cause the rotation of the wedge, thereby producing the secondary scan vector. The device of the invention is depicted in greater detail in FIG. 2. As seen in the cross-section diagram, optical wedge 109 is held within ring 207 which is mounted in front of sensor optics 201 such that sensor line of sight 111 passes through the geometrical center of the wedge. The optical wedge may be made of any suitable material such as germanium and has a diameter that is not less than the diameter of the objective optics of the sensor and held in place within the ring by any suitable means such as optical glue. Ring 207 is appropriately coupled to sensor 113 via wedge spin bearing 203 to allow for rotation of the ring in the plane perpendicular to the sensor LOS. The rotation of ring 207 is accomplished by serrated gear drive 205 meshing with serrated rim 209 of ring 207 in response to motor 107 to which the gear drive is coupled in a conventional manner. As the meshing continues, ring 207 and the optical wedge held therein rotate, thereby creating the secondary scan vector. This secondary scan vector combines with primary scan vector generated by the circulating motion of sensor 113 and results in a scan pattern having a larger FOV than would the sensor alone and several points of low or zero scan velocity to allow collection of "snapshot" data at these points with little or no image smear.

Figure 3:
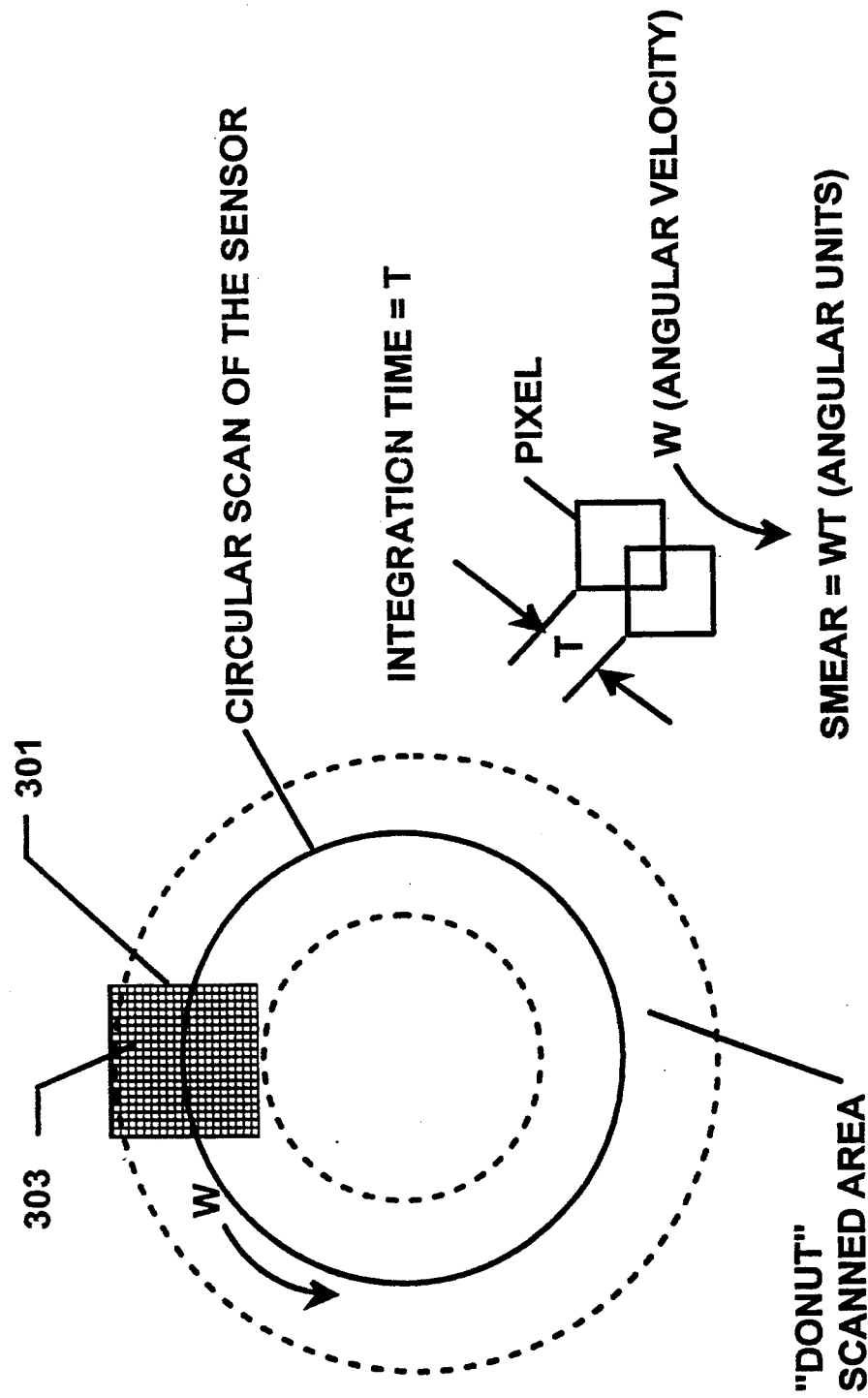
FIG. 3 is an illustration of the primary scan motion caused by the circulating sensor.
Figure 4:
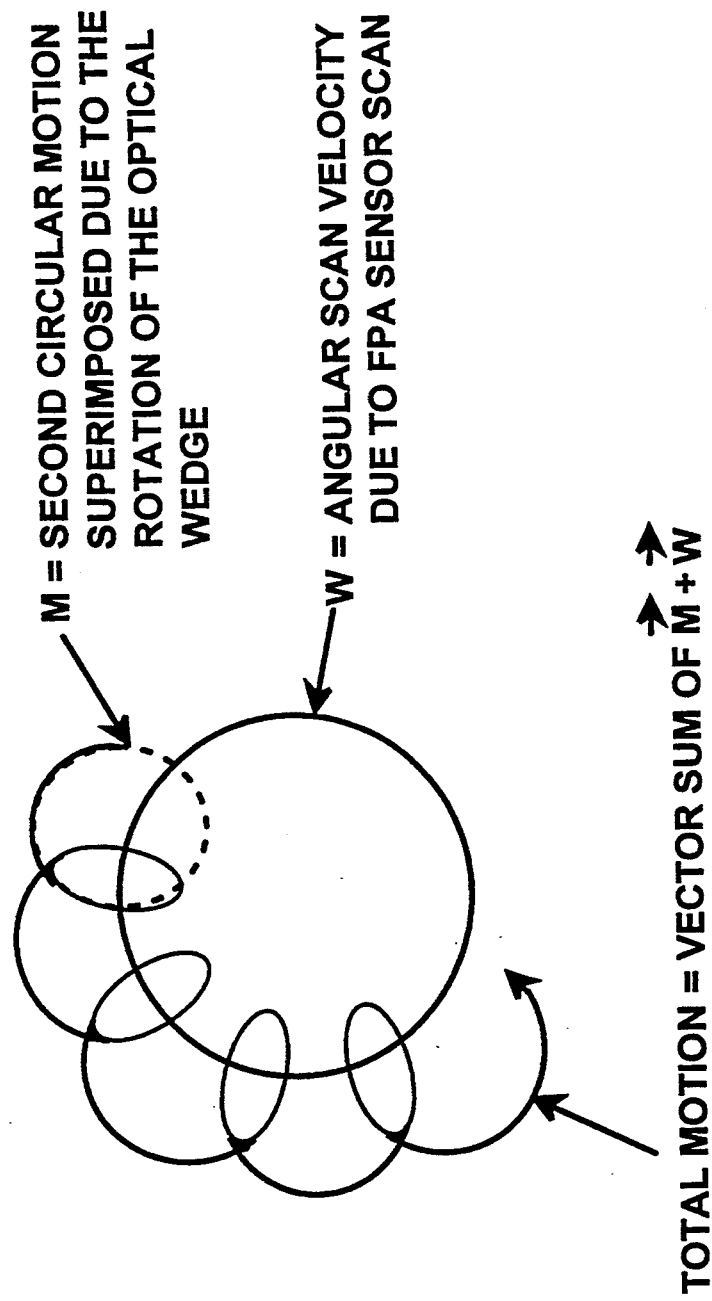
FIG. 4 depicts the scan pattern resulting from combining the primary scan motion of the FPA and the secondary scan motion of the rotating optical wedge.
Figure 5:
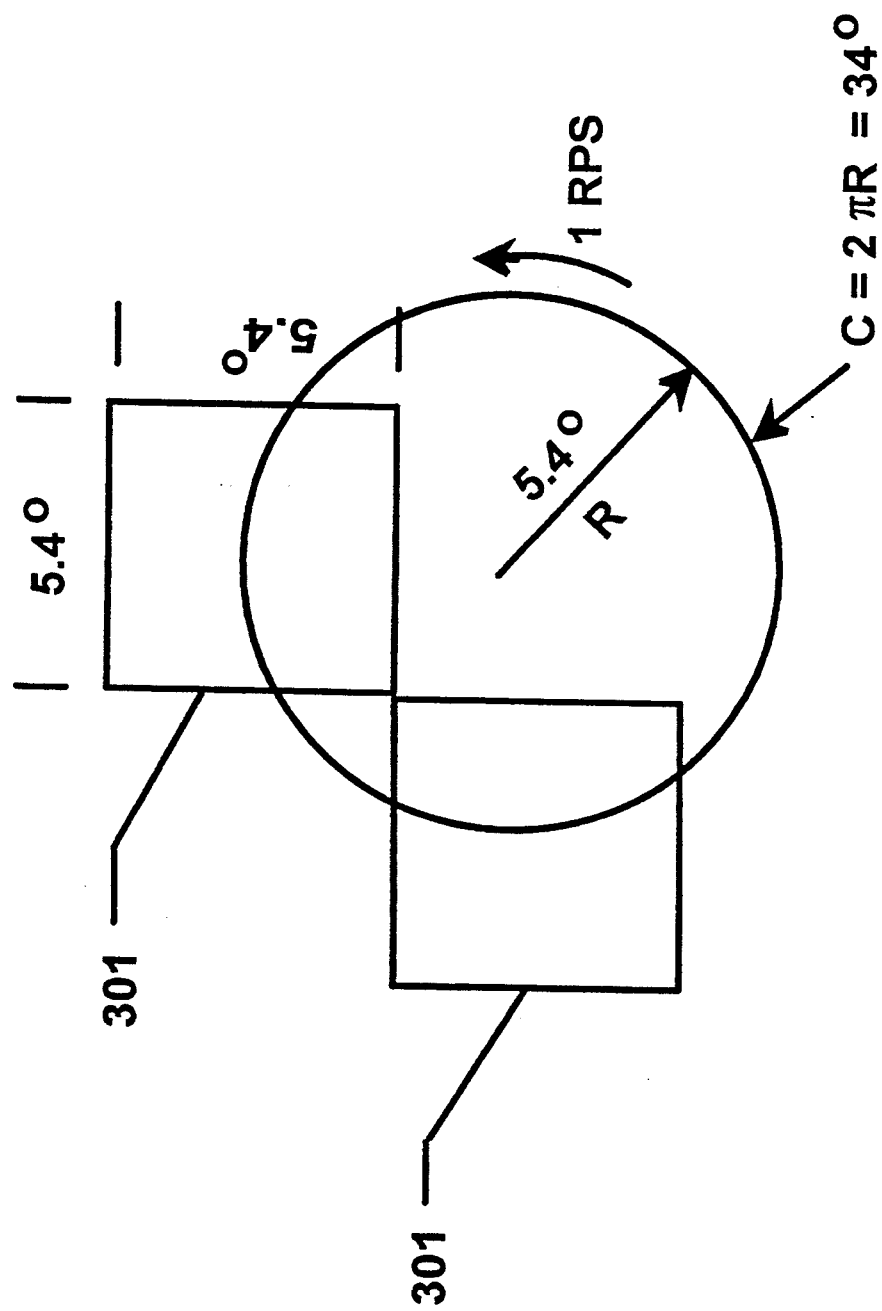
FIG. 5 shows how the dual scan motions provide a pattern that allows a wider FPA FOV as well as reduced smear of image.

To elaborate on the benefits of outfitting seeker 101 with the wedge, first, the operation of the seeker without the wedge is examined by referring to FIG. 3 which illustrates the spatial motion caused by the circular scan of the sensor without the wedge. As the sensor circulates, the field of view (FOV) of the focal plane array (FPA) 301, which incidentally is made of numerous pixels 303, nutates in space with a constant angular velocity. Therefore, if the integration time of the FPA is "T" and the scan velocity is "W", then "WT" is the motion or "smear" of the pixel element during the integration time in angular units. If a second circular motion is added by the rotating optical wedge, a combined scan pattern emerges that can be depicted as shown in FIG. 4. About the primary gimballed sensor circular scan, W, (also referred to as the sensor scan velocity or sensor scan vector), there is introduced a secondary "smaller" circular scan, M, generated by the rotating optical wedge. Together, the two optical vectors create a scan pattern that provides for a larger total FOV of the FPA while concurrently providing zero or near-zero spatial scan velocity from time to time. The following example with reference to FIG. 5 helps explain how the dual scan circular motions accomplish this:

Consider a 256×256 FPA with 0.5 milliradians (mr) instantaneous field-of-view which will give a total FPA FOV of 5.4×5.4 degrees. If this is placed on a 5.4 degree radius (R) search/scan radius and a time of 1 second is allowed for the circular search, then it is seen that approximately 16 degrees total cone is searched in less than 1.5 seconds, allowing for a frame of data to be taken at the center of the "donut" seen in FIG. 3. Also, the scan rate is 2 pi (5.4) degrees/1 second or 34 degrees/sec, easily obtainable with a rate-stabilized seeker.

Figure 6:
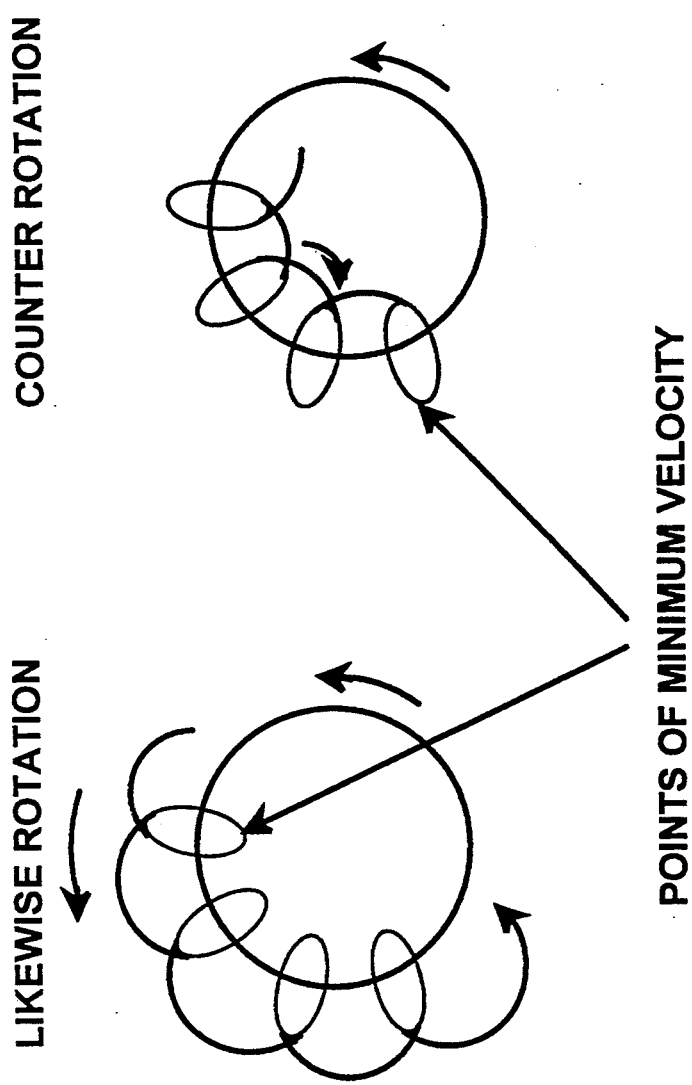
FIG. 6 illustrates two methods of causing low velocities using the two scan vectors from the two scan motions.

Two methods of causing low or near-zero spatial velocity with the two scan vectors are illustrated in FIG. 6. With likewise rotating vectors, the cusps of low spatial velocity occur interior to the sensor scan circle, while with counter rotating vectors, the cusps of low spatial velocity occur outside the sensor scan circle. If the sensor scan vector, W is on the order of 10 times greater than the wedge vector, M, then the cusp radius of 5.4 degrees can be generated by a 6 degree gimbaled sensor scan with a 0.6 degree optical wedge with likewise rotation. With counter rotation, the 5.4 degree needed framing circle can be approximately generated with a 5 degree gimbaled sensor scan and a 0.5 degree wedge scan vector (keeping a 10 to 1 ratio).

Figure 7:
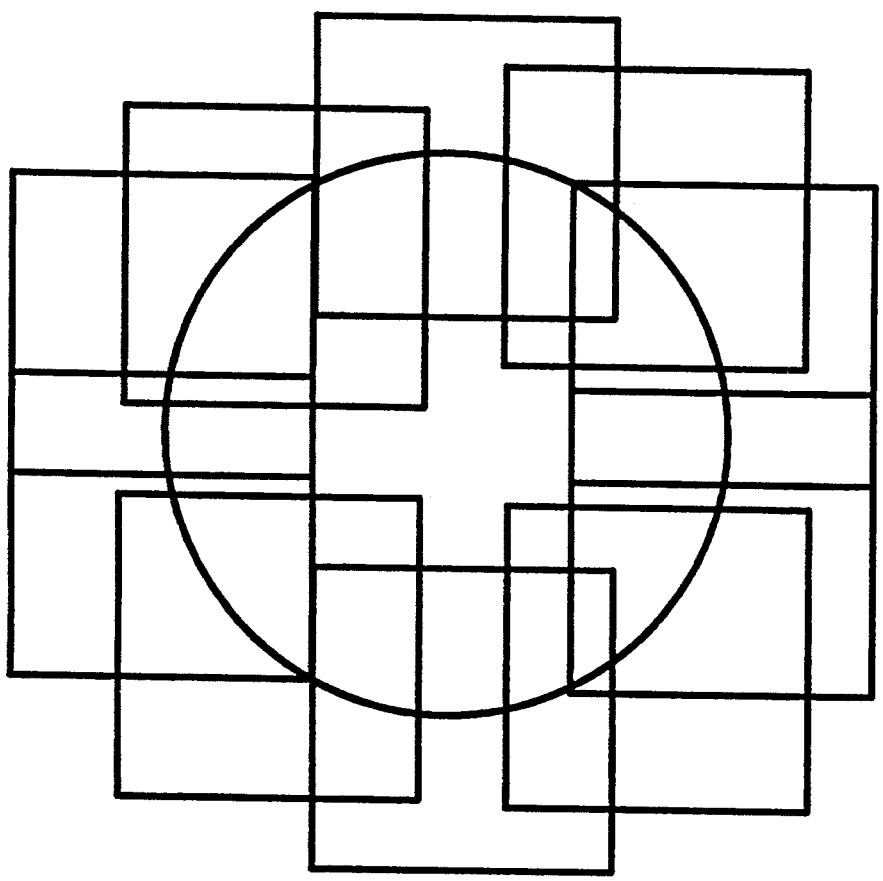
FIG. 7 shows the frames of data collected at low points of scan velocity.

The number of cusps, or points of low spatial velocity, is determined by the ratio of the periods of the two rotations. Since a time of approximately 1 second is desired to search the area, the period of the gimbaled scan vector will be 1 second. With 10 cusps about the gimbaled scan, the period of the wedge vector will be 0.1 second. The ten frames of data are indicated in FIG. 7.

This invention can be used to incorporate staring FPA IR seeker technology into missile applications which require a large circular search FOV.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. In a rate-stabilized infrared seeker having a circulatable sensor for producing a primary scan vector, the sensor also having objective optics and gimbals for circulating the sensor; an improvement for increasing the sensor's field of view and concurrently decreasing the image smear, said improvement comprising: an optical wedge, and a means for rotating said wedge to produce a secondary scan vector, said wedge being juxtaposed to the objective optics such that the line of sight of the sensor passes through the geometrical center of said wedge and said secondary scan vector combines with the primary scan vector to produce a wider scan pattern having at least one point of low scan velocity.

2. An improvement as set forth in claim 1, wherein said rotating means comprises: a ring having a serrated rim, said ring being suitable for holding within its rim said optical wedge, a means for coupling said ring to the sensor so as to allow rotation of said ring in the plane perpendicular to the sensor line of sight, a motor and a gear drive, said gear drive being coupled between said motor and said ring to mesh with said serrated rim in response to said motor, thereby causing said ring to rotate.

3. An improvement as set forth in claim 2, wherein said wedge is circular and made of germanium.

4. An improvement as set forth in claim 3, wherein the diameter of said wedge is no less than the diameter of the objective optics of the sensor.

* * * * *